April 1, 1952  E. PEDRON  2,591,002
ROUTER
Filed Nov. 24, 1950
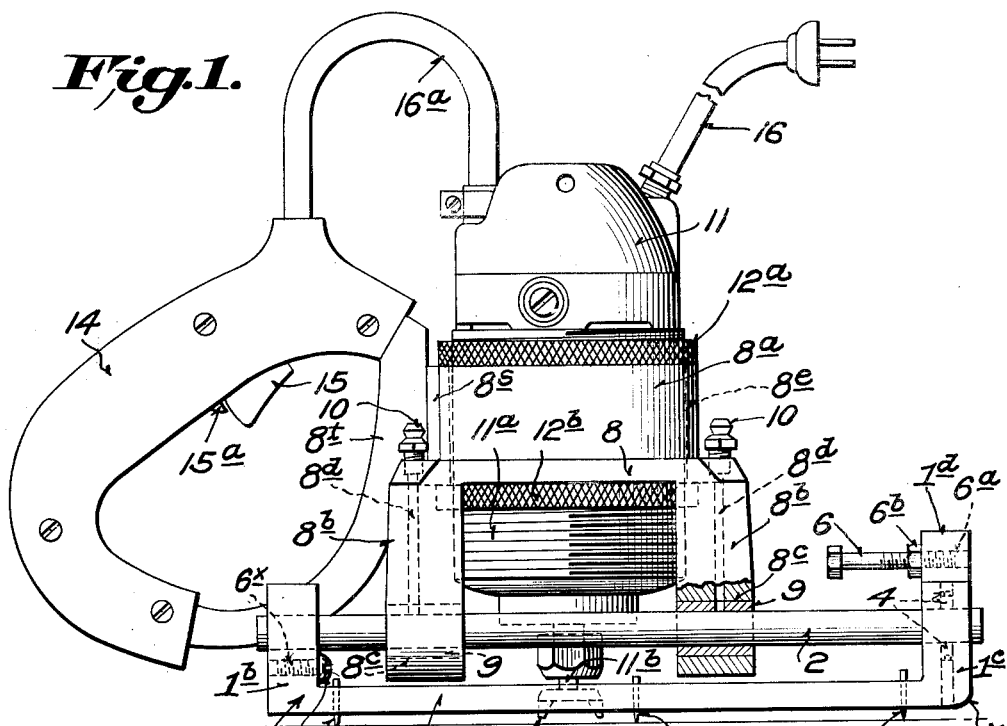
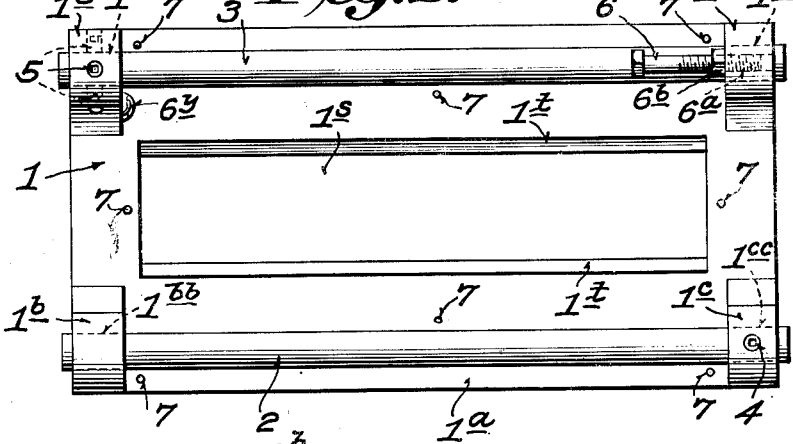
INVENTOR
Ettore Pedron
BY
ATTORNEYS Patented Apr. 1, 1952

2,591,002

UNITED STATES PATENT OFFICE 2,591,002

ROUTER

Ettore Pedron, Eugene, Oreg.

Application November 24, 1950, Serial No. 197,467

6 Claims. (Cl. 144—136)

My invention relates to improvements in routing machines of the type adapted to cut out imperfections, such as knots, in the outside layers of laminated plywood prior to insertion of pre-cut wooden plugs.

The principal object of my invention is to provide a small, power-driven router which, when placed on a sheet of plywood, will firmly anchor itself in the cutting position and will then rout out a cut of predetermined size and shape, each cut being exactly like the last so that pre-cut plugs will exactly fit the routed holes.

Another important object of my invention is to provide a router of the type specified which is adjustable to permit setting of the router to cut holes of the proper depth depending on the thickness of the outside layer of the plywood, and to permit setting of the length of travel of the cutting tool with respect to the supporting bed, which as above stated is anchored to the face of the plywood.

Still another object of the invention is to provide a router so arranged that when it is placed on the plywood sheet, its position thereon will be anchored before the cutting tool reaches the surface, and also so arranged that the cutting tool approaches the surface of the plywood along a path normal to this surface instead of along an arcuate path, such as is encountered in machines wherein the cutting tool is pivotally mounted to the machine-supporting bed. This feature of the invention assures that the walls of the cut will be accurately beveled at 105°, as required by the pre-cut patch, in the surface of the plywood sheet.

Another object yet is to provide means for insuring a precision sliding engagement between the cutting tool frame and the supporting bed so that the path of the cutting tool will be devoid of play and will be uniform with every cut, and means for properly lubricating the associated sliding surfaces to prevent wear and to facilitate maintenance.

A further object is to provide a router wherein the supporting bed is so shaped as to permit the operator to have an unobstructed view of the cutting tool in engagement with the plywood, thus facilitating location of the machine on the plywood over the imperfection to be routed out.

Still another object is to provide a compact routing machine of rugged construction having a convenient handle and switch assembly fixed on the tool supporting frame for convenient reciprocation thereof with respect to the supporting bed by either a right-handed or a left-handed person. Because the machine anchors itself to the plywood surface when placed thereon, it may be operated by a person using only one hand.

Other objects and advantages of the invention will become apparent during the following discussion of the drawing, wherein:

Figure 1 is a right side elevation of the router.

Fig. 2 is a plan view of the supporting bed of the router.

Fig. 3 is a front elevation of the supporting bed with the forward left-hand corner of the bed broken away to show the rear left-hand adjustable rod mounting lug.

Referring to the drawing, the machine comprises a supporting bed 1 having a flat plate 1a for its bottom and having upright lugs 1b, 1c, 1d and 1e in its respective corners. These lugs have aligned bores 1bb, 1cc, 1dd and 1ee through them for the purpose of receiving and supporting in parallel relation the rods 2 and 3. As shown in Fig. 3, the rod 2 is held in place by a pair of set screws 4 in the lug 1c, and the rod 3 is held in place by four set screws 5 in the lug 1e, diagonally opposite the lug 1c. These set screws 4 and 5 not only secure the rods against longitudinal displacement, but serve the additional purpose of providing adjustments whereby the rods may be set in exactly mutually-parallel relation. As shown in Figs. 1 and 3, the lug 1d is somewhat higher than the other three lugs and has a tapped bore 6a through it parallel to the bore 1dd. A screw 6 is adjustably engaged in the bore 6a facing inwardly and is fixed in adjusted position by a lock nut 6b for the purpose hereinafter described. In addition, on the opposite lug 1e is located a tapped bore 6x in which is fixed a standard screw 6y with its head projecting inwardly for the purpose hereinafter described.

The bottom plate 1a has a longitudinally disposed slot 1s down its center, the slot having its sides 1t relieved at about a 60° angle for the purpose hereinafter described. In addition, a plurality of needles 7 are positioned in the bottom plate 1a to extend downwardly through the plate 1a adapted to pierce the plywood sheet and maintain the plate 1a in positive engagement therewith.

A cutter supporting frame 8 is provided, said frame having a vertically disposed cylindrical body 8a and having four legs 8b extending downwardly therefrom and fixed to the body 8a at 90° intervals thereabout. The opposed legs 8b on each side of the body 8a have aligned bores 8c therethrough, said bores 8c each having a sleeve bearing 9 therein. The sleeve bearings 9 are drilled and reamed to provide a sliding fit on the rods 2 and 3 on which they are supported. In order to facilitate lubrication of the sleeve bearings 9 on the rods 2 and 3, a duct 8d is provided in each of the legs 8b which duct communicates with the sleeve bearing 9 at its lower end and with a standard grease fitting 10 at its upper end.

The cylindrical body 8a has a large central bore 8e therethrough for the purpose of receiving the casing 11a of the drive motor 11, this casing 11a being externally threaded as shown in Fig. 1. The motor 11 is fixed in the bore 8e by means of upper and lower knurled locking rings 12a and 12b, respectively, it being understood that the position of the motor 11 may be axially adjusted by loosening one ring and tightening the other. A shaft 11b extends downwardly from the motor 11 and carries thereon the cutting tool 13 adapted to engage the plywood when the machine is positioned thereon.

A boss 8s is provided on the rear of the body 8a, said boss 8s supporting a curved member 8t adapted to be attached to the handle 14 carrying an electric switch 15 and a latch 15a adapted when actuated to hold the switch in closed position for continuous operation, the switch being of the usual normally-open type. A power cable 16 is provided and has an extension 16a going to the switch 15 in the handle.

In operation, the machine is rested on the forward end of the bed plate 1a, rounded as at 1x, against the plywood sheet over the defect to be removed. The slot 1s is aligned over the defect, and the rear of the plate 1a lowered toward the plywood with the cutting tool 13 rotating. As the machine is lowered, the needles 7 engage the plywood just before the cutter 13 reaches it so that the machine is firmly held in place against slippage by the time the cutter reaches and engages the wood. The machine is then pressed downwardly until the plate 1a is seated against the surface of the plywood at which time the cutting tool 13 has reached its maximum depth of cut, i. e. one layer of ply. The cutter frame 8 is then reciprocated on the rods 2 and 3 so that the original circular cut is elongated to form an oval shaped hole of predetermined size.

It will be noted that the screw 6 provides an adjustable stop determining the length of travel of the cutter frame 8 with respect to the supporting bed 1 and therefore the length of travel of the cutter in the plywood. In addition, the screw head 6y projecting inwardly from the lug 1e serves as a stop limiting the rearward travel of the frame 8 and serving to eliminate inaccurate length of cut due to accumulation of dust, grease and cuttings at the ends of the rods 2 and 3. The depth of cut of the cutter is set by adjusting the settings of the knurled rings 12a and 12b to raise or lower the motor 11 in the mounting frame 8. The slot 1s is beveled at 1t on each side to provide a clearer view of the engagement of the cutter in the plywood.

After the defect is routed out, a wooden plug is inserted in the cut and glued therein. The plugs are preformed and exactly fit the cut made by the machine, and the walls of the cut are clean and accurately beveled at 105° in cross section since the approach of the cutter to the plywood is along a path normal thereto.

I do not limit the use of my invention to the application set forth herein since it obviously has other applications. Only one preferred embodiment is shown, though other embodiments are possible within the scope of the claims.

I claim:

1. A motor driven hand tool for routing out defects in the outer layers of plywood sheets comprising a bed plate having a longitudinal slot; a frame having an upper portion with a vertical bore therethrough and having a lower portion depending therefrom; guide rods on the bed plate parallel to said slot and engaging complementary bearing surfaces on said lower portion to provide a precision sliding engagement between said frame and said bed plate; a motor fixed in said bore with its shaft extending downwardly into said slot; a cutting tool fixed on said shaft and extending downwardly through said slot to engage the plywood sheet; and a means for anchoring said plate on the plywood surface, said means engaging the plywood before the cutting tool as the device is lowered thereon.

2. In a device as set forth in claim 1, a standard grease fitting on said lower portion of the frame associated with each of said bearings; and a duct from each fitting to its associated bearing to permit lubrication of the sliding engagement.

3. In a device as set forth in claim 1, a handle fixed to one end of said frame; an electric control switch in said handle, the switch being of the normally-open type; latch means adapted to when actuated hold the switch in closed position for continuous operation; the lower transverse edge of said bed plate opposite the handle end of the device being rounded to provide an edge whereon the device may be tiltingly supported on the plywood while the slot is being positioned over the defect.

4. A motor driven hand tool for routing out defects in the outer layers of plywood sheets comprising a bed plate having a centrally located longitudinal slot; a frame having an upper portion with a vertical bore therethrough and having a lower portion depending therefrom; upstanding lugs on the corners of the bed plate supporting a pair of guide rods disposed parallel to said slot and engaging complementary sleeve bearings fixed in said lower portion to provide a precision sliding engagement between said frame and said bed plate; means in said lugs for setting the rods in mutually-parallel relation; a motor fixed in said bore with its shaft extending downwardly into said slot; a cutting tool fixed on said shaft and extending downwardly through said slot to engage the plywood sheet; and a plurality of needles extending downwardly through said bed plate to anchor said plate on the plywood surface, said needles engaging the plywood before the cutting tool as the device is lowered thereon.

5. In a device as set forth in claim 4, a standard grease fitting on said lower portion of the frame associated with each of said bearings; and a duct from each fitting to its associated bearing to permit lubrication of the sliding engagement.

6. In a device as set forth in claim 4, a handle fixed to one end of said frame; an electric control switch in said handle, the switch being of the normally-open type; latch means adapted to when actuated hold the switch in closed position for continuous operation; the lower transverse edge of said bed plate opposite the handle end of the device being rounded to provide an edge whereon the device may be tiltingly supported on the plywood while the slot is being positioned over the defect.

ETTORE PEDRON.

REFERENCES CITED

The following references are of record in the file of this patent:

UNITED STATES PATENTS

| Number | Name | Date |
|---|---|---|
| 1,115,995 | Willson | Nov. 3, 1914 |
| 1,679,074 | Carter | July 31, 1928 |
| 1,698,827 | Skolnik | Jan. 15, 1929 |
| 1,718,324 | Wappat | June 25, 1929 |
| 1,745,780 | Casey | Feb. 4, 1930 |
| 1,780,174 | Crowe | Nov. 4, 1930 |
| 1,899,883 | Sacrey | Feb. 28, 1933 |
| 2,071,519 | Gragg | Feb. 23, 1937 |

FOREIGN PATENTS

| Number | Country | Date |
|---|---|---|
| 516,584 | Germany | Jan. 24, 1931 |